United States Patent
Hung et al.

(10) Patent No.: US 9,637,091 B2
(45) Date of Patent: May 2, 2017

(54) HETEROGENEOUS ENERGY SUPPLY SYSTEM

(71) Applicant: National Taiwan Normal University, Taipei (TW)

(72) Inventors: Yi-Hsuan Hung, Taipei (TW); Jian-Hao Chen, Wujie Township (TW); Fang-Sheng Li, Taipei (TW); Siang-Ting Huang, Taipei (TW); Ming-Lun You, Taipei (TW)

(73) Assignee: NATIONAL TAIWAN NORMAL UNIVERSITY, Taipei (TW)

( * ) Notice: Subject to any disclaimer, the term of this patent is extended or adjusted under 35 U.S.C. 154(b) by 474 days.

(21) Appl. No.: 14/278,397

(22) Filed: May 15, 2014

(65) Prior Publication Data
US 2015/0175011 A1     Jun. 25, 2015

(30) Foreign Application Priority Data

Dec. 25, 2013   (TW) .............................. 102148268 A

(51) Int. Cl.
*B60S 5/02*     (2006.01)
*B60S 5/06*     (2006.01)
(Continued)

(52) U.S. Cl.
CPC ................. *B60S 5/02* (2013.01); *B60L 8/003* (2013.01); *B60L 11/002* (2013.01);
(Continued)

(58) Field of Classification Search
CPC ...... B60S 5/00; B60S 5/02; B60S 5/06; B60L 2230/22; B60L 11/1822; E04H 1/1233; E04H 1/1205; Y10T 29/49623; Y10T 137/3802; F17C 5/06; F17C 5/007; F17C 2221/012; F17C 2221/031; F17C 2270/0139; F17C 2270/0136; F17C 2270/0184; F17C 2270/0168; Y02E 60/34; Y02E 60/321
See application file for complete search history.

(56) References Cited

U.S. PATENT DOCUMENTS 7,007,766 B2 * 3/2006 Iwasaki ............... B60L 11/1881
                                                                180/65.1
7,602,143 B2 * 10/2009 Capizzo ............... B60K 15/063
                                                                104/34
(Continued)

FOREIGN PATENT DOCUMENTS

CN       101855769 A    10/2010
CN       201821261 U    5/2011

*Primary Examiner* — Ryan Johnson
(74) *Attorney, Agent, or Firm* — Birch, Stewart, Kolasch & Birch, LLP

(57) ABSTRACT

A heterogeneous energy supply system includes an electric power management unit controlled by a control unit to output electric power. An electricity supply unit is powered by the electric power management unit, and is controlled by the control unit to regulate the electric power so as to provide an electricity output. An air supply unit is powered by the electric power management unit, and is controlled by the control unit to generate an air output. A hydrogen supply unit is powered by the electric power management unit, and is controlled by the control unit to generate a hydrogen gas output.

14 Claims, 5 Drawing Sheets

(51) Int. Cl.
*F17C 5/00* (2006.01)
*E04H 1/12* (2006.01)
*B60L 8/00* (2006.01)
*B60L 11/18* (2006.01)
*B60L 11/00* (2006.01)

(52) U.S. Cl.
CPC ....... *B60L 11/1811* (2013.01); *B60L 11/1851* (2013.01); *B60L 11/1881* (2013.01); *B60S 5/06* (2013.01); *E04H 1/1233* (2013.01); *F17C 5/007* (2013.01); *F17C 2270/0139* (2013.01); *Y02E 60/34* (2013.01); *Y02T 10/7005* (2013.01); *Y02T 10/7083* (2013.01); *Y02T 10/7241* (2013.01); *Y10T 307/658* (2015.04)

(56) References Cited

U.S. PATENT DOCUMENTS

| | | | | |
|---|---|---|---|---|
| 8,560,147 B2* | 10/2013 | Taylor | ...................... | B60L 1/003 340/5.8 |
| 8,573,242 B2* | 11/2013 | Cajiga | ....................... | B60S 5/02 137/15.01 |
| 2012/0007542 A1* | 1/2012 | Jammer | .............. | B60L 11/1824 320/101 |
| 2013/0282472 A1* | 10/2013 | Penilla | ..................... | B60S 5/06 705/14.35 |

* cited by examiner

HETEROGENEOUS ENERGY SUPPLY SYSTEM

CROSS-REFERENCE TO RELATED APPLICATION

This application claims priority to Taiwanese Application No. 102148268, filed on Dec. 25, 2013.

BACKGROUND OF THE INVENTION

1. Field of the Invention

This invention relates to an energy supply system, more particularly to a heterogeneous energy supply system.

2. Description of the Related Art

In recent years, vehicles driven using alternative energy sources such as electricity, compressed air and hydrogen gas are increasingly developed. However, the existing charging station is usually dedicated to supply a specific one of the alternative energy sources.

SUMMARY OF THE INVENTION

Therefore, the object of the present invention is to provide a heterogeneous energy supply system capable of providing various energy sources.

According to this invention, the heterogeneous energy supply system includes a control unit, an electric power management unit, an electricity supply unit, an air supply unit, and a hydrogen supply unit. The electric power management unit is electrically connected to and controlled by the control unit to output electric power. The electricity supply unit is electrically connected to the electric power management unit for receiving the electric power therefrom, and is electrically connected to and controlled by the control unit to regulate the electric power so as to provide an electricity output. The air supply unit is electrically connected to the electric power management unit for receiving the electric power therefrom, and is electrically connected to and controlled by the control unit to generate an air output. The hydrogen supply unit is electrically connected to the electric power management unit for receiving the electric power therefrom, and is electrically connected to and controlled by the control unit to generate a hydrogen gas output.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
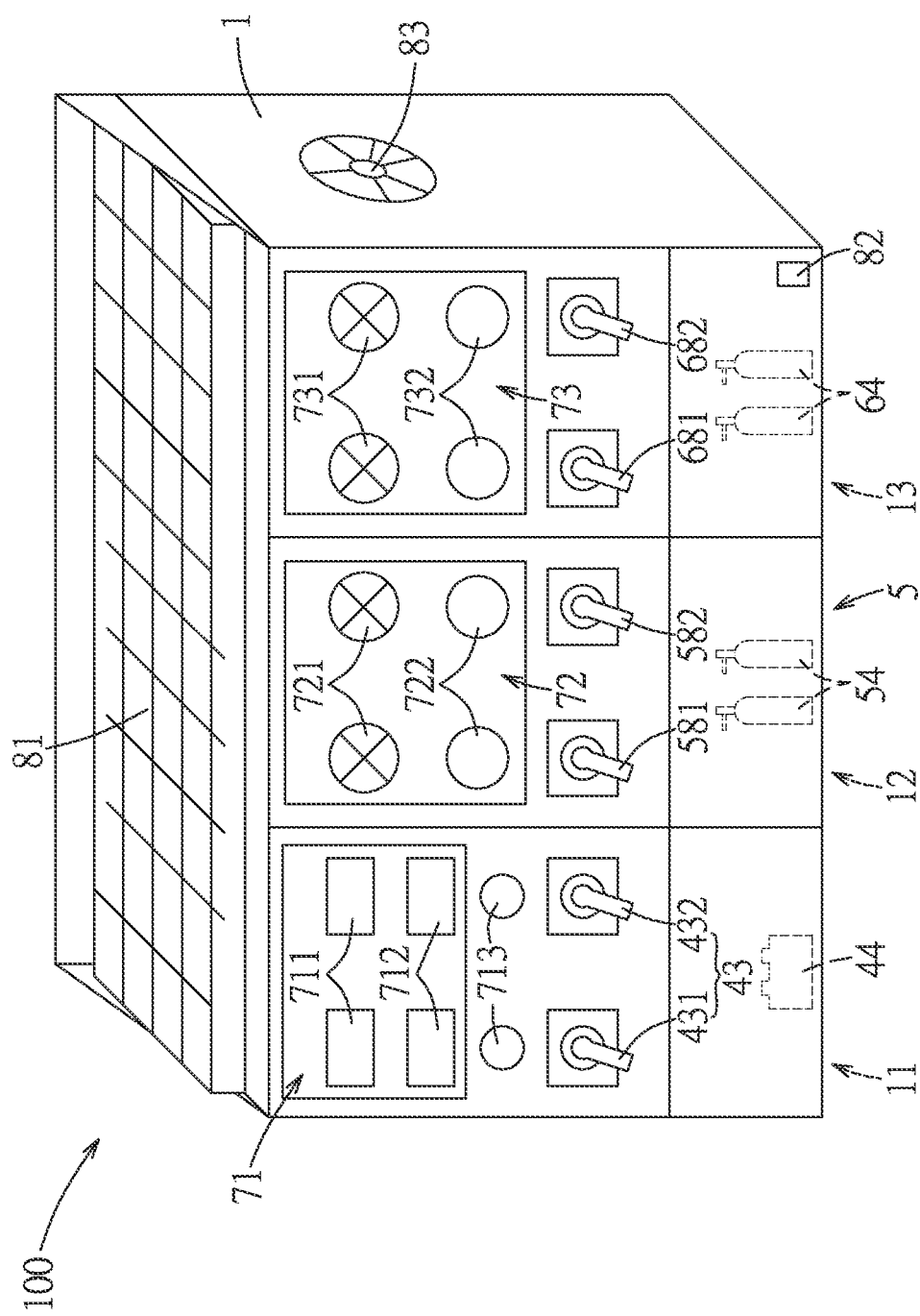
FIG. 1 is a perspective view of a preferred embodiment of a heterogeneous energy supply system according to the present invention.
Figure 2:
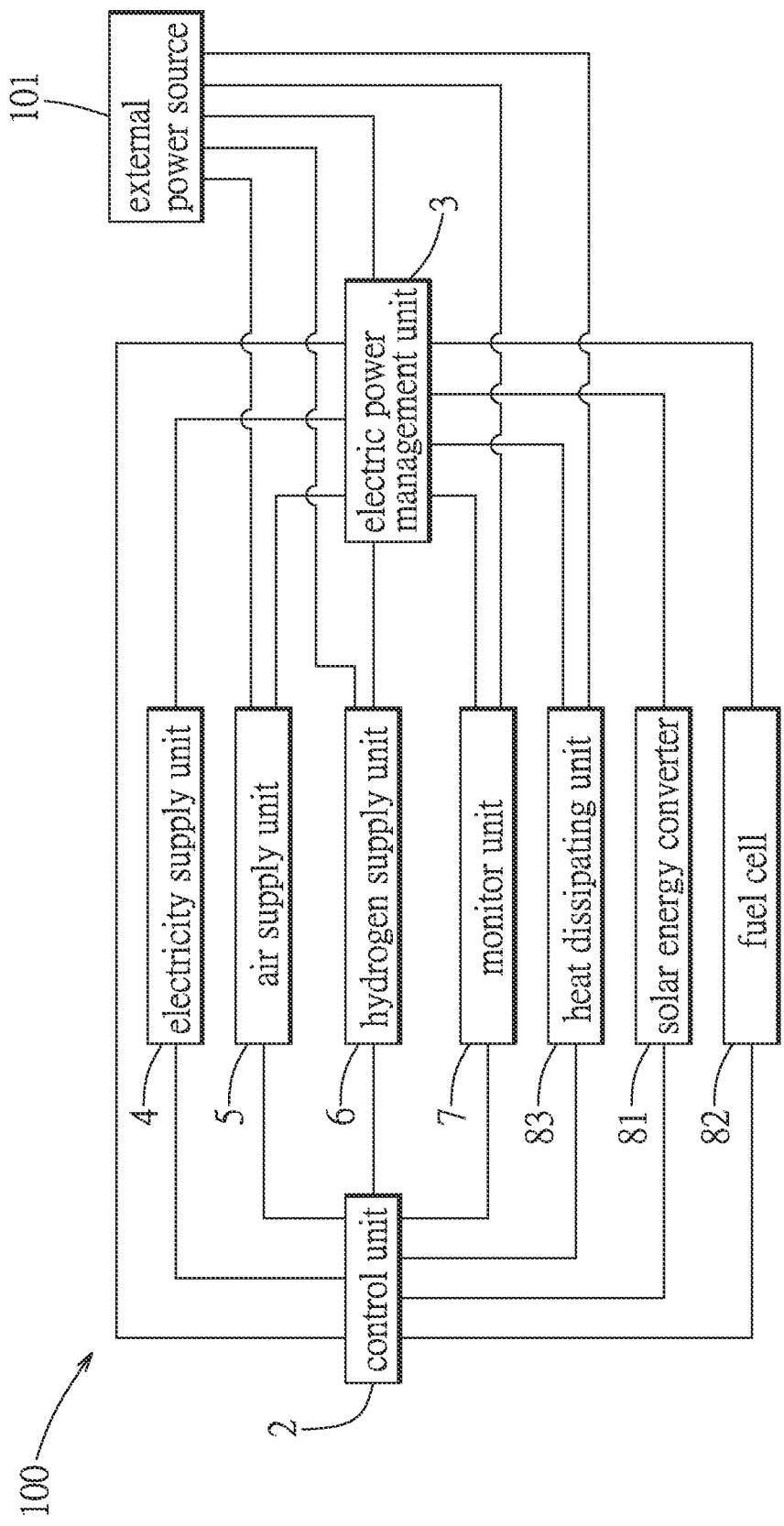
FIG. 2 is a block diagram of the preferred embodiment.
Figure 3:
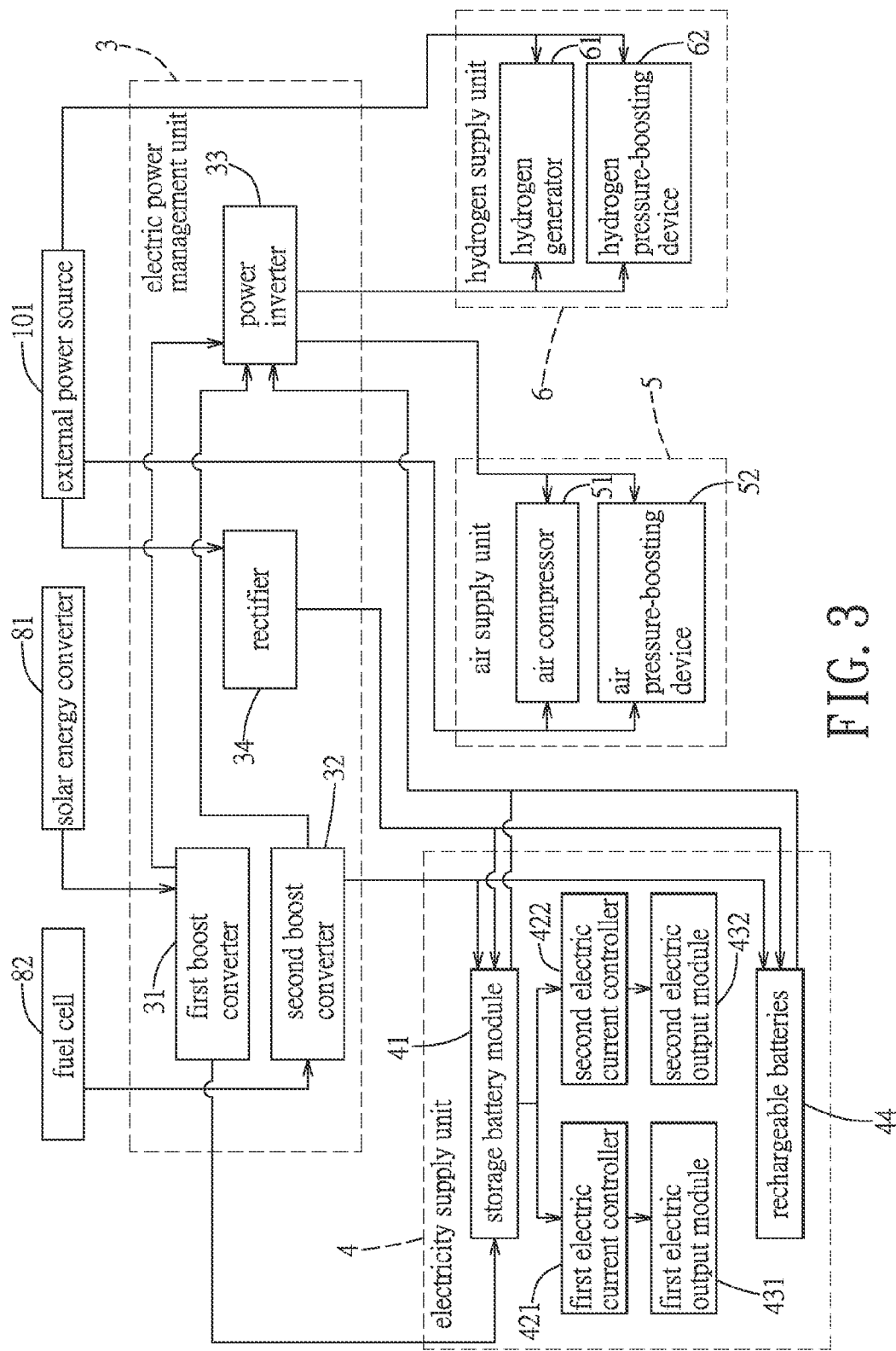
FIG. 3 is another block diagram for illustrating detailed architecture of some components of the preferred embodiment.

Referring to FIGS. 1 to 3, the preferred embodiment of the heterogeneous energy supply system 100 according to the present invention includes a cabinet 1, a control unit 2, an electric power management unit 3, an electricity supply unit 4, an air supply unit 5, a hydrogen supply unit 6, a monitor unit 7, a solar energy converter 81, a fuel cell 82 and a heat dissipating unit 83.

The cabinet 1 is substantially rectangular parallelepiped. An inner space of the cabinet 1 can be divided into first, second and third compartments 11, 12, 13 for receiving the electricity supply unit 4, the air supply unit 5, and the hydrogen supply unit 6 therein, respectively. Note that the configuration of the cabinet 1 may be varied as desired, and is not limited to this context.

The control unit 2 is disposed in the first compartment 11 and may be implemented using a microcomputer system including but not limited to an integrated central processor, a memory, various transmission ports, and Microbox compatible with MATLAB®.

The hydrogen supply unit 6 is electrically connected to the electric power management unit 3 for receiving the electric power therefrom, and is electrically connected to and controlled by the control unit 2 to generate a hydrogen gas output. The detailed architecture of the hydrogen supply unit 6 will be described later.

The solar energy converter 81 is disposed on a top surface of the cabinet 1, is electrically connected to the electric power management unit 3, and is operable to convert solar energy into electric energy to be provided to the electric power management unit 3. The fuel cell 82 is electrically connected to the electric power management unit 3, is coupled to the hydrogen supply unit 6 for receiving the hydrogen gas output therefrom, and is operable to generate cell-generated electricity using the hydrogen gas output received from the hydrogen supply unit 6 and to provide the cell-generated electricity to the electric power management unit 3.

The electric power management unit 3 is disposed in the first compartment 11, and is electrically connected to and controlled by the control unit 2 to output electric power. In this embodiment, the electric power management unit 3 includes a first boost converter 31, a second boost converter 32, a power inverter 33 and a rectifier 34.

The first boost converter 31 is electrically connected to the solar energy converter 81 and the electricity supply unit 4, is for receiving the electric energy from the solar energy converter 81, and boosts the electric energy so as to provide a first boosted direct current (DC) as the electric power to the electricity supply unit 4. The second boost converter 32 is electrically connected to the fuel cell 82 and the electricity supply unit 4, is for receiving the cell-generated electricity from the fuel cell 82, and boosts the cell-generated electricity so as to output a second boosted DC as the electric power to the electricity supply unit 4.

It should be noted that the power management unit 3 may include only one boost converter that is electrically connected to the solar energy converter 81 and the fuel cell 82 and that can boost the electric energy and the cell-generated electricity respectively received therefrom to output a boosted DC as the electric power to the electricity supply unit 4 in other embodiments of the present invention.

The power inverter 33 is electrically connected to the first and second boost converters 31, 32, the air supply unit 5, and the hydrogen supply unit 6. The power inverter 33 is for receiving the first and second boosted DC from the first and second boost converters 31, 32, and is operable to convert each of the first and second boosted DC into an alternating current (AC) output and to output the AC output as the electric power to the air supply unit 5 and the hydrogen supply unit 6. That is, the electric energy and the cell-generated electricity respectively from the solar energy converter 81 and the fuel cell 82 are boosted and converted into the AC output to be utilized by the air supply unit 5 and the hydrogen supply unit 6.

The rectifier 34 is electrically connected to the electricity supply unit 4 and an external power source 101, is for receiving external electricity from the external power source 101, and is operable to convert the external electricity into a DC output and to provide the DC output as the electric power to the electricity supply unit 4. Thus, the electricity supply unit 4 receives the electric power from the electric power management unit 3 including the first and second boosted DCs, which are converted from the electric energy and the cell-generated electricity generated by the solar energy converter 81 and the fuel cell 82, respectively, and the DC output, which is converted from the external electricity from the external power source 101. Accordingly, the electricity supply unit 4 is electrically connected to and controlled by the control unit 2 to regulate the electric power so as to stably provide an electricity output using the various electric power.

The electricity supply unit 4 is disposed in the first compartment 11 in this embodiment and is configured for charging electric vehicles. In this embodiment, the electricity supply unit 4 includes a storage battery module 41, a first electric current controller 421, a first electric output module 431, a second electric current controller 422, a second electric output module 432, and a plurality of replaceable and rechargeable batteries 44. The storage battery module 41 is electrically connected to the electric power management unit 3 for receiving and storing the electric power therefrom. In particular, the storage battery module 41 is electrically connected to the first boost converter 31, the second boost converter 32 and the rectifier 34.

Note that the power inverter 33 is also electrically connected to the storage battery module 41 for receiving the electric power stored therein, and is operable to convert the electric power into an AC output and to output the AC output as the electric power to the air supply unit 5 and the hydrogen supply unit 6.

The first electric current controller 421 is electrically connected to the storage battery module 41 for receiving the electric power stored in the storage battery module 41, and generates a first electric output with a first predetermined current value by regulating the electric power received from the storage battery module 41. The first electric output module 431 is electrically connected to the first electric current controller 421 for outputting the first electric output as the electricity output.

The second electric current controller 422 is electrically connected to the storage battery module 41 for receiving the electric power stored in the storage battery module 41, and can generate a second electric output with a second predetermined current value, which is different from the first predetermined current value, by regulating the electric power received from the storage battery module 41. The second electric output module 432 is electrically connected to the second electric current controller 422 for outputting the second electric output as the electricity output. In this embodiment, the second predetermined current value is smaller than the first predetermined current value. That is to say, the first electric output module 431 is a fast charging module and the second electric output module 432 is a slow charging 11 module. Additionally, a user may directly replace a rechargeable battery in the electric vehicle with the replaceable and rechargeable batteries 44.

It should be noted that, in other embodiments of this invention, the electricity supply unit 4 may include only one electric current controller and one electric output module that is capable of generating electric output with various current values as desired.

Figure 4:
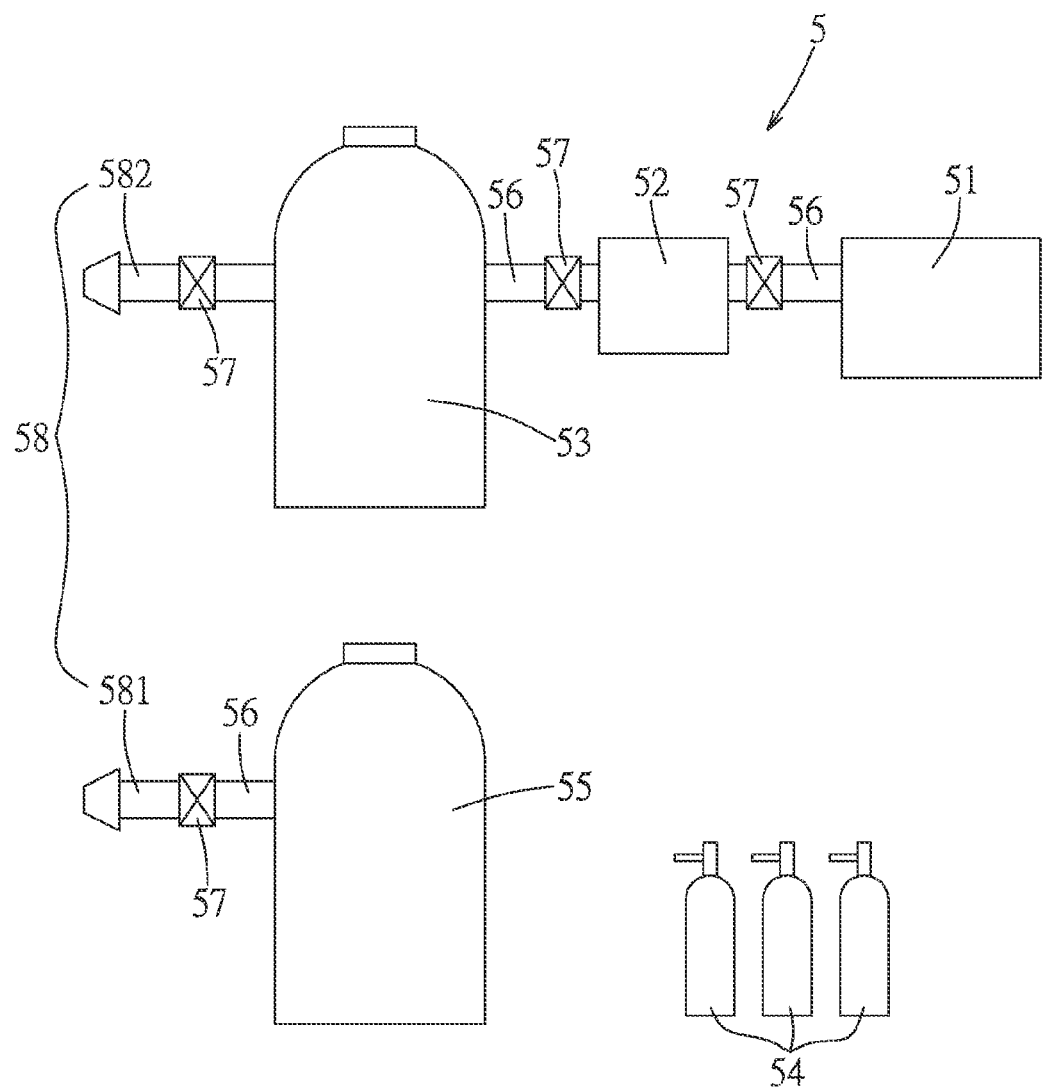
FIG. 4 is a schematic view of an air supply unit of the preferred embodiment.

Further referring to FIG. 4, the air supply unit 5 is disposed in the second compartment 12 in the cabinet 1, and is configured for refilling pneumatic vehicles. The air supply unit 5 is electrically connected to the power inverter 33 for receiving the AC output therefrom as the electric power, and is electrically connected to and controlled by the control unit 2 to generate an air output.

In this embodiment, the air supply unit 5 includes an air compressor 51, an air pressure-boosting device 52, an air storage device 53, a plurality of replaceable air storage devices 54, a high-pressure air storage device 55, a plurality of air transporting pipelines 56, a plurality of valves 57, and an air output module 58.

The air compressor 51 is operable to generate compressed air with pressure greater than atmospheric pressure. The air pressure-boosting device 52 is, for example, a booster pump that is in spatial communication with the air compressor 51 for receiving the compressed 11 air therefrom, and can further increase the pressure of the compressed air so as to output high-pressure air. The air storage device 53 is, for example, a gas cylinder that is in spatial communication with the air pressure-boosting device 52 for receiving and storing the high-pressure air therein.

The high-pressure air storage device 55 may be a replaceable air storage device that serves as a substitute air output when the air storage device 53 is short of high-pressure air.

Alternatively, the high-pressure air storage device 55 may store ultra high-pressure air therein with pressure greater than the high-pressure air stored in the air storage device 53. In this case, the air output module 58 includes a fast refilling pipeline 581 in spatial communication with the high-pressure air storage device 55, and a slow refilling pipeline 582 in spatial communication with the air storage device 53, so as to output the ultra high-pressure air stored in the high-pressure air storage device 55 and the high-pressure air stored in the air storage device 53 as air output with different air pressures, respectively.

The air transporting pipelines 56 interconnect the air compressor 51 and the air pressure-boosting device 52, the air pressure-boosting device 52 and the air storage device 53, the air storage device 53 and the slow refilling pipeline 582, and the high-pressure air storage device 55 and the fast refilling pipeline 581, respectively, so as to establish spatial communication therebetween. Each of the valves 57 is configured to control air flow between spatially-communicated two of the above-mentioned components.

Additionally, a user may replace an air storage device in the compressed air vehicle with the replaceable air storage devices 54.

Note that the detailed configuration of the air supply unit 5 may be altered depending on different demands, and is not limited to the specific structure disclosed herein. For example, the air pressure-boosting device 52 may be omitted when the compressed air generated by the air compressor 51 has a pressure sufficient for refilling pneumatic vehicles.

Figure 5:
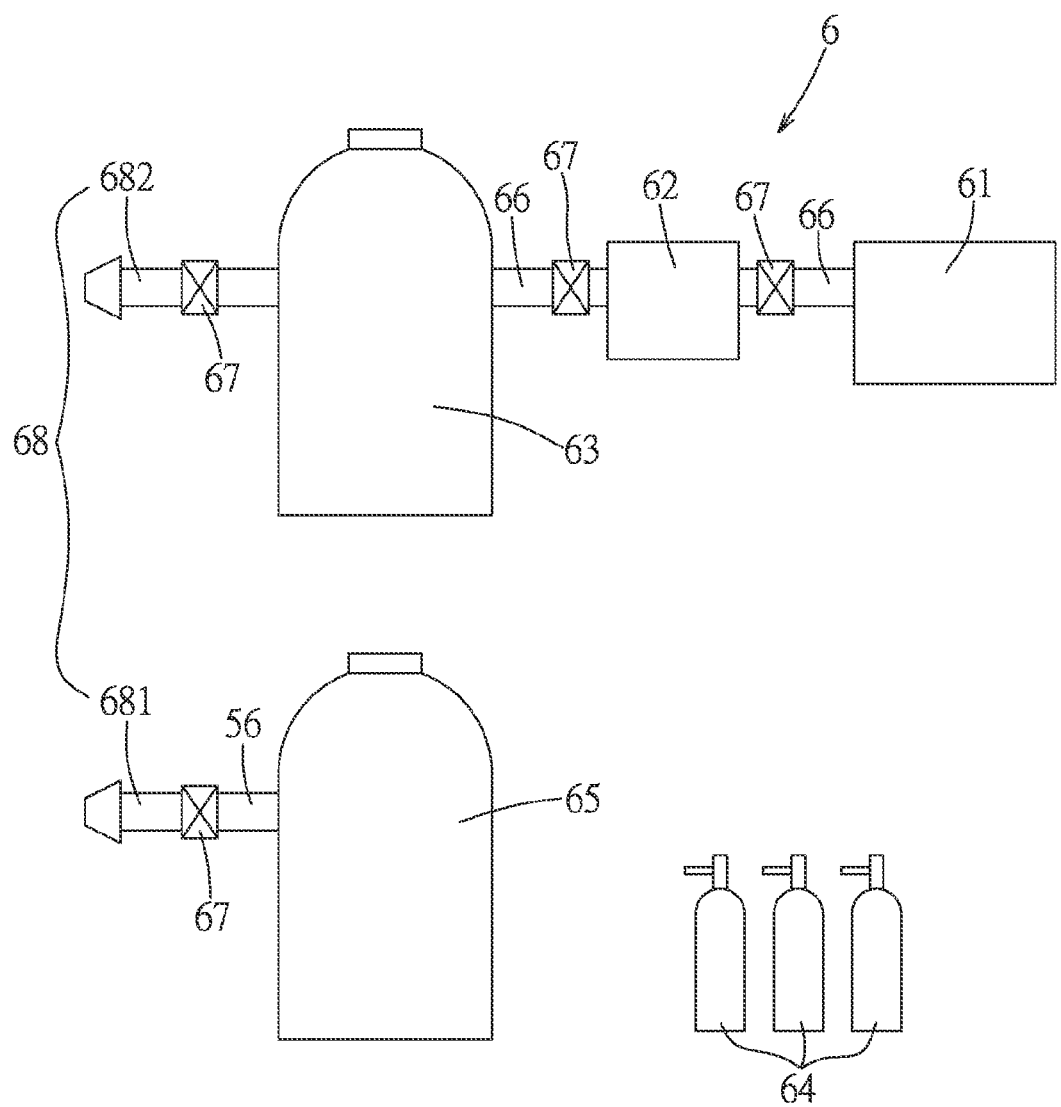
FIG. 5 is a schematic view of a hydrogen supply unit of the preferred embodiment.

Further referring to FIG. 5, the hydrogen supply unit 6 is disposed in the third compartment 13 in the cabinet 1, and is configured for generating the hydrogen gas output to refill hydrogen vehicles, such as hydrogen internal combustion engine vehicles (HICEV). The hydrogen supply unit 6 includes a hydrogen generator 61, a hydrogen pressure-boosting device 62, a hydrogen gas storage device 63, a plurality of replaceable hydrogen gas storage devices 64, a high-pressure hydrogen gas storage device 65, a plurality of hydrogen transporting pipelines 66, a plurality of valves 67, and a hydrogen output module 68.

The hydrogen generator 61 generates compressed hydrogen gas with pressure greater than atmospheric pressure by electrolysis of water. The hydrogen pressure-boosting device 62 is in spatial communication with the hydrogen generator 61 for receiving the compressed hydrogen gas therefrom, and can further increase the pressure of the compressed hydrogen gas so as to output high-pressure hydrogen gas. The hydrogen gas storage device 63 is in spatial communication with the hydrogen pressure-boosting device 62 for receiving and storing the high-pressure hydrogen gas therein. In this embodiment, the hydrogen gas storage device 63 is coupled to the fuel cell 82 for providing the high-pressure hydrogen gas stored therein as the hydrogen gas output to the fuel cell 82. It can be appreciated that the hydrogen generator 61 or the hydrogen pressure-boosting device 62 may be coupled to the fuel cell 82 to provide the compressed hydrogen gas or the high-pressure hydrogen gas generated thereby as the hydrogen gas output to the fuel cell 82 in other embodiments of this invention.

Similar to the high-pressure air storage device 55 described above, the high-pressure hydrogen gas storage device 65 may serve as a substitute hydrogen gas output when the hydrogen gas storage device 63 is short of high-pressure hydrogen gas. Also, the high-pressure hydrogen gas storage device 65 may store ultra high-pressure hydrogen gas therein with pressure greater than the high-pressure hydrogen gas stored in the hydrogen gas storage device 63. In this case, the hydrogen output module 68 includes a fast refilling pipeline 681 in spatial communication with the high-pressure hydrogen gas storage device 65 and a slow refilling pipeline 682 in spatial communication with the hydrogen gas storage device 63 so as to output the ultra high-pressure hydrogen gas stored in the high-pressure hydrogen gas storage device 65 and the high-pressure hydrogen gas stored in the hydrogen storage gas device 63 as hydrogen output with different pressures, respectively.

The hydrogen transporting pipelines 66 interconnect the hydrogen generator 61 and the hydrogen pressure-boosting device 62, the hydrogen pressure-boosting device 62 and the hydrogen gas storage device 63, the hydrogen gas storage device 63 and the slow refilling pipeline 682, and the high-pressure hydrogen gas storage device 65 and the fast refilling pipeline 681, respectively, so as to establish spatial communication therebetween. Each of the valves 67 is configured to control hydrogen gas flow between spatially-communicated two of the above-mentioned components.

It should be noted that the air supply unit 5 and the hydrogen supply unit 6 are also electrically connected to the external power source 101 for receiving the external electricity therefrom, and may operate using the external electricity.

The monitor unit 7 includes an electricity output indicator 71, an air output indicator 72 and a hydrogen gas output indicator 73.

The electricity output indicator 71 detects and indicates at least one of a voltage value, a current value and power of the electricity output, and includes ammeters 711, voltmeters 712 and indicating lamps 713. The ammeters 711 and the voltmeters 712 detect and indicate electricity information regarding at least one of the current value, the voltage value and the power of the electricity output from each of the first and second electric output modules 431, 432. Moreover, the ammeters 711 and the voltmeters 712 may further transmit the electricity information to the control unit 2. The indicating lamps 713 are lit continuously or in a blinking manner to indicate states of a charging operation.

The air output indicator 72 includes pressure gauges 721 and indicating lamps 722. The pressure gauges 721 detect and indicate air flow information regarding at least one of pressure and flow rate of the air output from each of the fast and slow refilling pipelines 581, 582. Moreover, the pressure gauges 721 further transmit the air information to the control unit 2. The indicating lamps 722 are lit to indicate states of a compressed air refilling operation.

Similarly, the hydrogen gas output indicator 73 includes pressure gauges 731 and indicating lamps 732. The pressure gauges 731 detect and indicate hydrogen gas information regarding at least one of pressure and flow rate of the hydrogen gas output from each of the fast and slow refilling pipelines 681, 682. Moreover, the pressure gauges 731 further transmit the hydrogen gas information to the control unit 2. The indicating lamps 732 are lit to indicate states of a hydrogen gas refilling operation.

Accordingly, by virtue of the monitor unit 7 and the control unit 2, a system administrator may be made aware of operating status of the heterogeneous energy supply system 100, and the user using the heterogeneous energy supply system 100 may be informed of the amount of consumed energy. The control unit 2 is capable of controlling operations of the electric power management unit 3, the electricity supply unit 4, the air supply unit 5 and the hydrogen supply unit 6 according to the electricity, air flow and hydrogen gas information received from the monitor unit 7, and is further capable of calculating price of the consumed energy when the charging procedure, the compressed air refilling procedure, or the hydrogen gas refilling procedure is completed. Thereafter, the user can pay via an automatic or manual payment collection system (not shown).

Besides, the heat dissipating unit 83 is mounted on a surrounding wall of the cabinet 1 for dissipating heat generated by components disposed inside the cabinet 1 to thereby prevent system failure, and may be implemented as a fan, a water-cooling system, or an air-cooling system.

To sum up, the advantages of the heterogeneous energy supply system 100 of the present invention are as follows. By virtue of the electric power management unit 3 and the electricity supply unit 4, excess electric power stored in the storage battery module 41 may be converted by the power inverter 33 for use by the air supply unit 5 and the hydrogen supply unit 6. Also, excess hydrogen gas stored in the hydrogen supply unit 6 may be provided to the fuel cell 82 to generate the cell-generated electricity provided to the electric power management unit 3. By this way, effective energy recycle and reuse can be achieved in the heterogeneous energy supply system 100. Additionally, the design of the replaceable batteries 44, the replaceable air storage devices 54, and the replaceable hydrogen gas storage devices 64 makes it convenient for the user to replace one of the rechargeable battery, the air storage device and the hydrogen gas storage device in a vehicle so that waiting for charging or gas filling may be eliminated.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

What is claimed is:

1. A heterogeneous energy supply system comprising:
a control unit;
an electric power management unit electrically connected to and controlled by said control unit to output electric power;
an electricity supply unit electrically connected to said electric power management unit for receiving the electric power therefrom, and electrically connected to and controlled by said control unit to regulate the electric power so as to provide an electricity output;
an air supply unit electrically connected to said electric power management unit for receiving the electric power therefrom, and electrically connected to and controlled by said control unit to generate an air output; and
a hydrogen supply unit electrically connected to said electric power management unit for receiving the electric power therefrom, and electrically connected to and controlled by said control unit to generate a hydrogen gas output,
wherein said electricity supply unit includes:
a storage battery module electrically connected to said electric power management unit for receiving and storing the electric power therefrom;
a first electric current controller electrically connected to said storage battery module for receiving the electric power stored in said storage battery module, and operable to generate a first electric output with a first predetermined current value by regulating the electric power received from said storage battery module; and
a first electric output module electrically connected to said first electric current controller for outputting the first electric output as the electricity output.

2. The heterogeneous energy supply system as claimed in claim 1, further comprising a solar energy converter that is electrically connected to said electric power management unit, and that is operable to convert solar energy into electric energy to be provided to said electric power management unit.

3. The heterogeneous energy supply system as claimed in claim 2, wherein said electric power management unit includes:
a boost converter that is electrically connected to said solar energy converter and said electricity supply unit, that is for receiving the electric energy from said solar energy converter, and that is operable to boost the electric energy so as to provide a boosted direct current (DC) as the electric power to said electricity supply unit; and
a power inverter electrically connected to said boost converter, said air supply unit and said hydrogen supply unit, that is for receiving the boosted DC from said boost converter, and that is operable to convert the boosted DC into an alternating current (AC) output and to output the AC output as the electric power to said air supply unit and said hydrogen supply unit.

4. The heterogeneous energy supply system as claimed in claim 1, further comprising a fuel cell that is electrically connected to said electric power management unit, that is coupled to said hydrogen supply unit for receiving the hydrogen gas output therefrom, and that is operable to generate cell-generated electricity using the hydrogen gas output received from said hydrogen supply unit and to provide the cell-generated electricity to said electric power management unit.

5. The heterogeneous energy supply system as claimed in claim 4, wherein said electric power management unit includes:
a boost converter that is electrically connected to said fuel cell and said electricity supply unit, that is for receiving the cell-generated electricity from said fuel cell, and that is operable to boost the cell-generated electricity so as to output a boosted DC as the electric power to said electricity supply unit; and
a power inverter that is electrically connected to said boost converter, said air supply unit and said hydrogen supply unit, that is for receiving the boosted DC from said boost converter, and that is operable to convert the boosted DC into an alternating current (AC) output and to output the AC output as the electric power to said air supply unit and said hydrogen supply unit.

6. The heterogeneous energy supply system as claimed in claim 1, wherein said electric power management unit includes a rectifier that is electrically connected to said electricity supply unit, that is adapted to be electrically connected to an external power source for receiving external electricity therefrom, and that is operable to convert the external electricity into a direct current (DC) output and to provide the DC output as the electric power to said electricity supply unit;
wherein said air supply unit and said hydrogen supply unit are adapted to be electrically connected to the external power source for receiving the external electricity therefrom, and are configured to operate using the external electricity.

7. The heterogeneous energy supply system as claimed in claim 1, wherein said electricity supply unit further includes:
a second electric current controller electrically connected to said storage battery module for receiving the electric power stored in said storage battery module, and operable to generate a second electric output with a second predetermined current value, which is different from the first predetermined current value, by regulating the electric power received from said storage battery module; and
a second electric output module electrically connected to said second electric current controller for outputting the second electric output as the electricity output.

8. The heterogeneous energy supply system as claimed in claim 7, wherein the second predetermined current value is smaller than the first predetermined current value.

9. The heterogeneous energy supply system as claimed in claim 1, wherein said electric power management unit includes a power inverter that is electrically connected to said storage battery module, said air supply unit and said hydrogen supply unit, that is for receiving the electric power stored in said storage battery module, and that is operable to convert the electric power into an alternating current (AC) output and to output the AC output as the electric power to said air supply unit and said hydrogen supply unit.

10. The heterogeneous energy supply system as claimed in claim 1, wherein said air supply unit includes an air compressor operable to generate compressed air with pressure greater than atmospheric pressure.

11. The heterogeneous energy supply system as claimed in claim 10, wherein said air supply unit further includes:
an air pressure-boosting device in spatial communication with said air compressor for receiving the compressed air therefrom, and operable to further increase the pressure of the compressed air so as to output high-pressure air; and an air storage device in spatial communication with said air pressure-boosting device for receiving and storing the high-pressure air therein, and operable to output the high-pressure air stored therein as the air output.

12. The heterogeneous energy supply system as claimed in claim 1, wherein said hydrogen supply unit includes a hydrogen generator operable to generate compressed hydrogen gas with pressure greater than atmospheric pressure.

13. The heterogeneous energy supply system as claimed in claim 12, wherein said hydrogen supply unit further includes:
   a hydrogen pressure-boosting device in spatial communication with said hydrogen generator for receiving the compressed hydrogen gas therefrom, and operable to further increase the pressure of the compressed hydrogen gas so as to output high-pressure hydrogen gas; and
   a hydrogen gas storage device in spatial communication with said hydrogen pressure-boosting device for receiving and storing the high-pressure hydrogen gas therein, and operable to output the high-pressure hydrogen gas stored therein as the hydrogen gas output.

14. The heterogeneous energy supply system as claimed in claim 1, further comprising a monitor unit that includes:
   an electricity output indicator operable to detect and indicate at least one of a voltage value, a current value and power of the electricity output;
   an air output indicator operable to detect and indicate at least one of pressure and flow rate of the air output; and
   a hydrogen gas output indicator operable to detect and indicate at least one of pressure and flow rate of the hydrogen gas output.

* * * * *